(12) United States Patent
Park et al.

(10) Patent No.: US 12,529,827 B2
(45) Date of Patent: Jan. 20, 2026

(54) WINDOW PANEL WITH IMPROVED ADHESION AND A DISPLAY DEVICE INCLUDING THE SAME

(71) Applicant: SAMSUNG DISPLAY CO., LTD., Yongin-si (KR)

(72) Inventors: Jintaek Park, Uiwang-si (KR); Jongkap Jo, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 335 days.

(21) Appl. No.: 17/819,085

(22) Filed: Aug. 11, 2022

(65) Prior Publication Data

US 2023/0209734 A1 Jun. 29, 2023

(30) Foreign Application Priority Data

Dec. 24, 2021 (KR) .......................... 10-2021-0186888

(51) Int. Cl.
*G02B 5/00* (2006.01)
*B32B 7/05* (2019.01)
(Continued)

(52) U.S. Cl.
CPC ................ *G02B 5/003* (2013.01); *B32B 7/05* (2019.01); *G02B 5/005* (2013.01); *G02F 1/133512* (2013.01); *B32B 2255/28* (2013.01); *B32B 2307/4023* (2013.01); *B32B 2307/7375* (2023.05); *B32B 2457/20* (2013.01);
(Continued)

(58) Field of Classification Search
CPC .......... G02B 5/003; G02B 5/005; B32B 7/05; B32B 2255/28; B32B 2307/4023; B32B 2307/7375; B32B 2457/20; G02F 1/133512; G02F 1/133314; G02F 1/133331; G02F 2202/28; G09F 9/335; G09F 9/35; G09F 9/30

See application file for complete search history.

(56) References Cited

U.S. PATENT DOCUMENTS

2019/0324177 A1* 10/2019 Ikeda ................ G02F 1/133502
2020/0348558 A1* 11/2020 Chen ................ G02F 1/133308
(Continued)

FOREIGN PATENT DOCUMENTS

KR 10-2018-0090920 8/2018
KR 10-2021-0049228 5/2021

*Primary Examiner* — Mariam Qureshi
(74) *Attorney, Agent, or Firm* — F. CHAU & ASSOCIATES, LLC

(57) ABSTRACT

A window panel including a base substrate comprised of a transmission area and a bezel area adjacent to the transmission area, and a light-shielding pattern disposed on the base substrate overlapping the bezel area. The light-shielding pattern includes a first light-shielding pattern disposed on the base substrate and having a first width extending from a first side of the base substrate to a second side of the base substrate, beneath the bezel area of the base substrate, and a second light-shielding pattern disposed on the first light-shielding pattern and having a second width extending from the first side of the base substrate to the second side of the base substrate, beneath the bezel area of the base substrate, wherein the second width is different from the first width. The first light-shielding pattern and the second light-shielding pattern including different materials.

19 Claims, 8 Drawing Sheets

(51) Int. Cl.
*G02F 1/1335* (2006.01)
*G02F 1/1333* (2006.01)

(52) U.S. Cl.
CPC .. *G02F 1/133314* (2021.01); *G02F 1/133331* (2021.01); *G02F 2202/28* (2013.01)

(56) References Cited

U.S. PATENT DOCUMENTS

2021/0122668 A1    4/2021  Shim et al.
2023/0072868 A1*  3/2023  Itakura .............. G02F 1/133512

* cited by examiner

WINDOW PANEL WITH IMPROVED ADHESION AND A DISPLAY DEVICE INCLUDING THE SAME

CROSS-REFERENCE TO RELATED APPLICATIONS

This U.S. non-provisional patent application claims priority under 35 U.S.C. § 119 to Korean Patent Application No. 10-2021-0186888, filed on Dec. 24, 2021 in the Korean Intellectual Property Office, the disclosure of which is hereby incorporated by reference herein in its entirety.

TECHNICAL FIELD

Embodiments of the inventive concept relate generally to display devices and in particular to a window panel with improved adhesion for use in a display device.

DISCUSSION OF RELATED ART

Mobile electronic devices, such as mobile phones, navigation devices, digital cameras, e-books, a handheld game consoles/terminals, incorporate either a liquid crystal display or an organic light emitting diode display as a display device. In general, a display device for use in a mobile device may be divided into a display part with a screen on which content is displayed, and a non-display part that surrounds the display part. The non-display part may include an ink layer for discriminating the non-display part from the display part and for preventing device wiring, from becoming visible due to external light formed in the non-display part.

Typically, the display device may be manufactured in such a way that the ink layer is formed on an edge of a window panel with the window panel being assembled jointly with a display panel. However, adhesive defects may occur due to the ink layer being formed on the edge of the window during the assembly process of the display panel and the window panel. Additionally, foreign matter may be easily introduced during the assembly process to cause a defect. Consequently, overall productivity may be reduced.

SUMMARY

An embodiment of the inventive concept provides a window panel with improved adhesion, which is bonded to a display panel and a housing member, and a display device including the window panel.

In embodiments of the inventive concept, a window panel includes a base substrate comprising a transmission area and a bezel area adjacent to the transmission area, and a light-shielding pattern disposed on a surface of the base substrate overlapping the bezel area. The light-shielding pattern includes a first light-shielding pattern disposed on a surface of the base substrate and having a first width, and a second light-shielding pattern disposed on a surface of the first light-shielding pattern and having a second width extending from the first side of the base sub state to the second side of the base substrate, beneath the bezel area of the base substrate, wherein the second width is different from the first width. The base substrate includes a top surface and a side surface extending from the top surface. The light-shielding pattern covers the top surface and the side surface of the base substrate. The second width may be equal to or less than about one half of the first width.

In an embodiment, a surface of the first light-shielding pattern may have a surface roughness different than a surface roughness of the second light-shielding pattern In an embodiment, the surface roughness of the first light-shielding pattern may be less than the surface roughness of the second light-shielding pattern.

In an embodiment, the base substrate may include a top surface and a side surface extending from the top surface. The light-shielding pattern may cover the top surface and the side surface of the base substrate.

In an embodiment, the first light-shielding pattern may include a first edge disposed on the top surface of the base substrate, and the second light-shielding pattern may include a second edge disposed on the top surface of the base substrate. The first edge may be configured closer to the transmission area, between the side surface of the base substrate and the transmission area, and the second edge may be configured closer to the side surface of the base substrate, between the side surface and the transmission area.

In an embodiment, the first edge of the first light-shielding pattern may be aligned with a boundary between the transmission area and the bezel area.

In an embodiment, the first light-shielding pattern may include a third edge disposed on the side surface of the base substrate, and the second light-shielding pattern may include a fourth edge disposed on the side surface of the base substrate. The third edge and the fourth edge may be aligned with each other.

In an embodiment, a thickness of the first light-shielding pattern may be the same as a thickness of the second light-shielding pattern.

According to an embodiment of the inventive concept, a display device includes a window panel, a display module, which is disposed below the window panel and displays an image, a housing member disposed below the display module and coupled to the window panel to provide an accommodation space for the display module. The window panel includes a base substrate comprised of a transmission area, a bezel area adjacent to the transmission area and a light-shielding pattern disposed on a surface of the base substrate overlapping the bezel area. The light-shielding pattern is comprised of a first light-shielding pattern disposed on a surface of the base substrate and having a first width, and a second light-shielding pattern disposed on a surface of the first light-shielding pattern and having a second width extending from the first side of the base sub state to the second side of the base substrate, beneath the bezel area of the base substrate, wherein the second width is different from the first width.

In an embodiment, the first light-shielding pattern and the second light-shielding pattern may include different materials.

In an embodiment, a surface of the first light-shielding pattern may have a first surface roughness, and a surface of the second light-shielding pattern may have a second surface roughness. The surface first roughness and the second surface roughness may be different from each other.

In an embodiment, the first surface roughness may be less than the second surface roughness.

In an embodiment, the display module may partially overlap the first light-shielding pattern and may not overlap the second light-shielding pattern.

In an embodiment, the housing member may be bonded to a surface of the second light-shielding pattern.

In an embodiment, the housing member may include a bonding area which is bonded to the window panel, and a width of the bonding area may be substantially the same as the second width of the second light-shielding pattern.

In an embodiment, the display module may include an active area and a peripheral area, and the display module and the window panel may be bonded to each other through a first adhesive member in the active area.

In an embodiment, a thickness of the first adhesive member may be greater than a thickness of the first light-shielding pattern, and in the peripheral area, a gap may be defined between the display module and the first light-shielding pattern.

In an embodiment, the display module may overlap the first light-shielding pattern in a first bonding area, and the housing member may overlap the second light-shielding pattern in a second bonding area. The first bonding area and the second bonding area may not overlap each other.

In an embodiment, the base substrate may include a top surface and a side surface extending from the top surface, and the light-shielding pattern may cover the top surface and the side surface.

In an embodiment, the second width may be equal to or less than about one half of the first width.

BRIEF DESCRIPTION OF THE DRAWINGS

The above and other features of the inventive concept will be more clearly understood from the following detailed description taken in conjunction with the accompanying drawings, in which.

DETAILED DESCRIPTION OF THE EMBODIMENTS

Figure 1A:
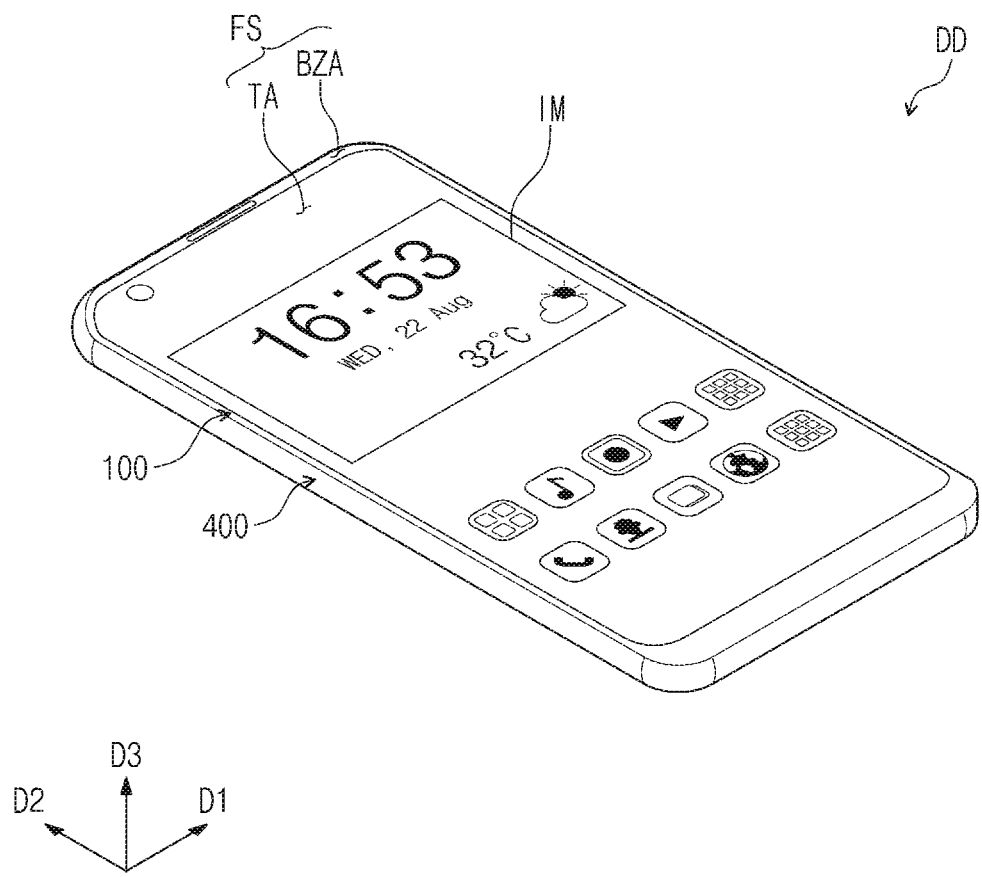
FIG. 1A is a perspective view of a display device according to an example embodiment of the inventive concept.

It will be understood that when an element (or region, layer, section, etc.) is referred to as being "on", "connected to" or "coupled to" another element, it can be disposed directly on, connected or coupled to the other element or a third intervening element may be disposed between the elements.

In addition, in the drawings, the thickness, the ratio, and the dimension of elements are exaggerated for effective description of the technical contents. The term "and/or" includes one or more combinations which may be defined by relevant elements.

It will be understood that, although the terms first, second, etc. may be used herein to describe various elements, these elements should not be limited by these terms. These terms are only used to distinguish one element from another element. For example, a first element could be termed a second element without departing from the teachings of the present invention, and similarly, a second element could be termed a first element. As used herein, the singular forms are intended to include the plural forms as well, unless the context clearly indicates otherwise.

In addition, the terms, such as "below", "beneath", "on" and "above", are used for explaining the relation of elements shown in the drawings. The terms are relative concept and are explained based on the direction shown in the drawing.

It will be further understood that the terms such as "includes" or "has", when used herein, specify the presence of stated features, numerals, steps, operations, elements, parts, or the combination thereof, but do not preclude the presence or addition of one or more other features, numerals, steps, operations, elements, parts, or the combination thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the inventive concept will be described with reference to the accompanying drawings. Like reference numerals may refer to like elements throughout the accompanying drawings.

FIG. 1A is a perspective view of a display device according to an embodiment of the inventive concept.

Figure 1B:
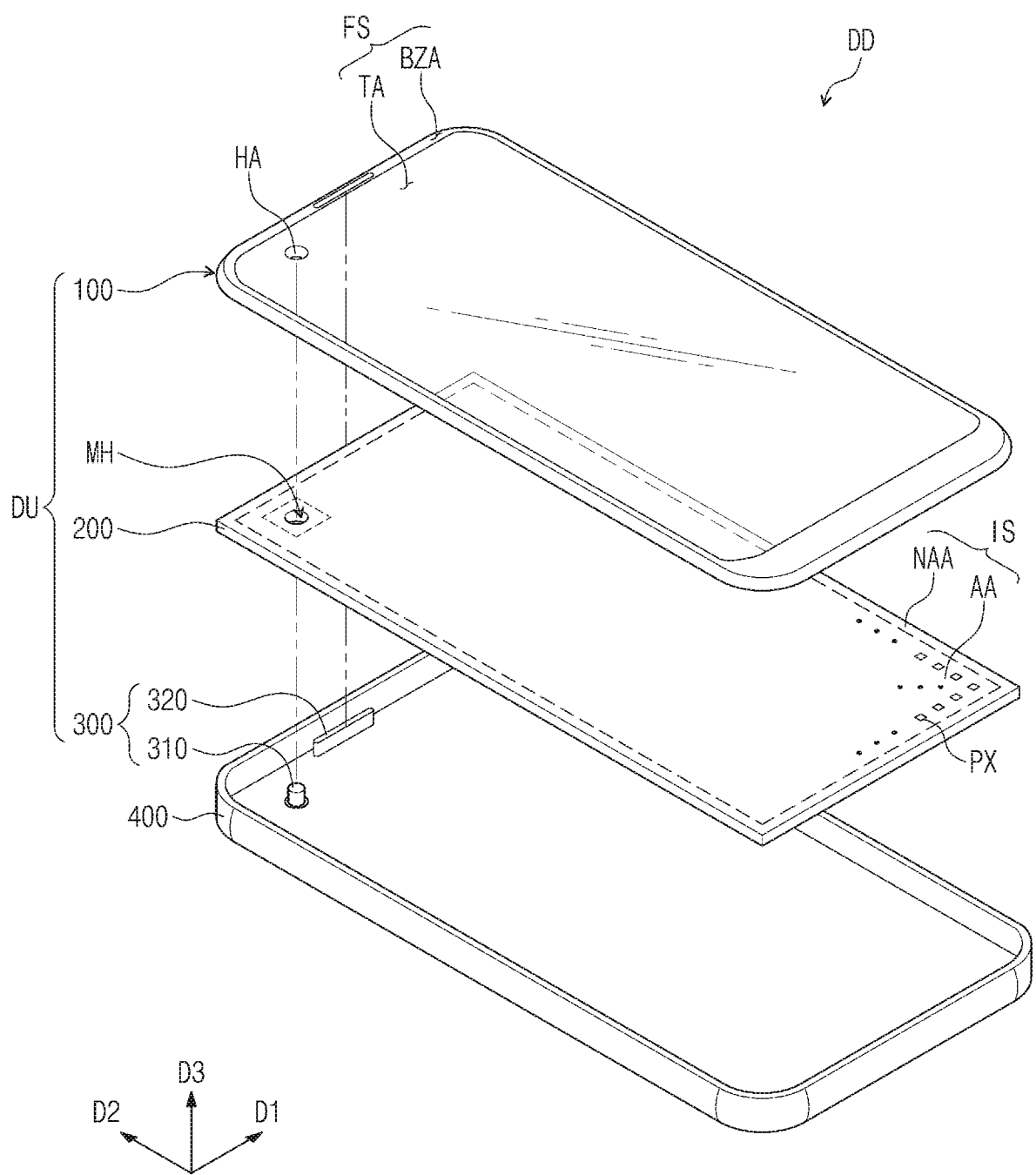
FIG. 1B is an exploded perspective view of the display device according to an example embodiment of the inventive concept.

FIG. 1B is an exploded perspective view of the display device of FIG. 1A according to an embodiment of the inventive concept.

Referring to FIGS. 1A and 1B, a display device DD displays an image IM in a third direction D3 from a plane defined by a first direction D1 and a second direction D2. The display device DD includes a window panel 100, a display module 200, an electronic module 300, and a housing member 400. In an embodiment, the window panel 100, the display module 200, and the electronic module 300 may be coupled to one another to constitute a display unit DU.

The window panel 100 is disposed on the display module 200 and covers a front surface IS of the display module 200. The window panel 100 includes a front surface FS exposed to the outside. An image displayed on the display module 200 is visible from the outside through the front surface FS of the window. The front surface FS of the window panel 100 may be divided into a transmission area TA and a bezel area BZA on the window plane.

The transmission area TA portion of the front surface FS of the window panel 100 may be an area that transmits incident light and may have a shape corresponding to an active area AA of the display Module 200 below it. For example, the transmission area TA may overlap a front surface or at least a portion of the active area AA. The image IM displayed on the active area AA of a display panel DP may be visible from the outside through the transmission area TA.

The bezel area BZA may have a relatively low light transmittance, compared to the transmission area TA. The bezel area BZA defines the shape of the transmission area TA. The bezel area BZA may be adjacent to the transmission area TA and surround the transmission area TA.

The bezel area BZA may have a predetermined color and may cover a peripheral area NAA of the display module 200 and block the peripheral area NAA of the display module 200 from being visible from the outside.

The display module 200 displays the image IM on the front surface IS. The front surface IS may be divided into the active area AA and the peripheral area NAA. The image IM is displayed on the active area AA. The peripheral area NAA is adjacent to the active area AA.

The display module 200 may include a plurality of pixels PX. The pixels PX emit light in response to an electrical signal. The light emitted by the pixels PX collectively form the image IM.

In one embodiment, a predetermined through-hole PX, which penetrates the display module 200, may be defined in the active area of the display module 200. A module hole MH may be defined in the active area AA of the display module 200.

The module hole MH of the display module 200 overlaps a hole area HA in the window panel 100. The module hole MH is defined in the active area AA. Accordingly, some of the pixels PX of the display module 200 may be arranged surrounding the module hole resulting in the image IM also being displayed on an area adjacent to the module hole MH.

The electronic module 300 includes various functional modules for operating the display device DD. The electronic module 300 may be electrically connected to the display module 200 through a connector or the like, which is not shown. For example, the electronic module 300 may be a camera, or a sensor that detects an external input (e.g., light, heat, etc.) and may receive an external input delivered through the module hole MH and the hole area HA. Conversely, the electronic module 300 or may provide an output through the module hole MH and the hole area HA.

The housing member 400 is disposed below the display module 200. The housing member 400 is coupled to the window panel 100 to constitute an exterior of the display device DD. The housing member 400 may include a material having relatively high strength, such as, for example, a material including a plurality of frames and/or plates made of glass, plastic or metal.

The housing member 400 provides a predetermined accommodation space for accommodating both the display module 200 and the electronic module 300 for protection against external impacts.

Figure 2A:
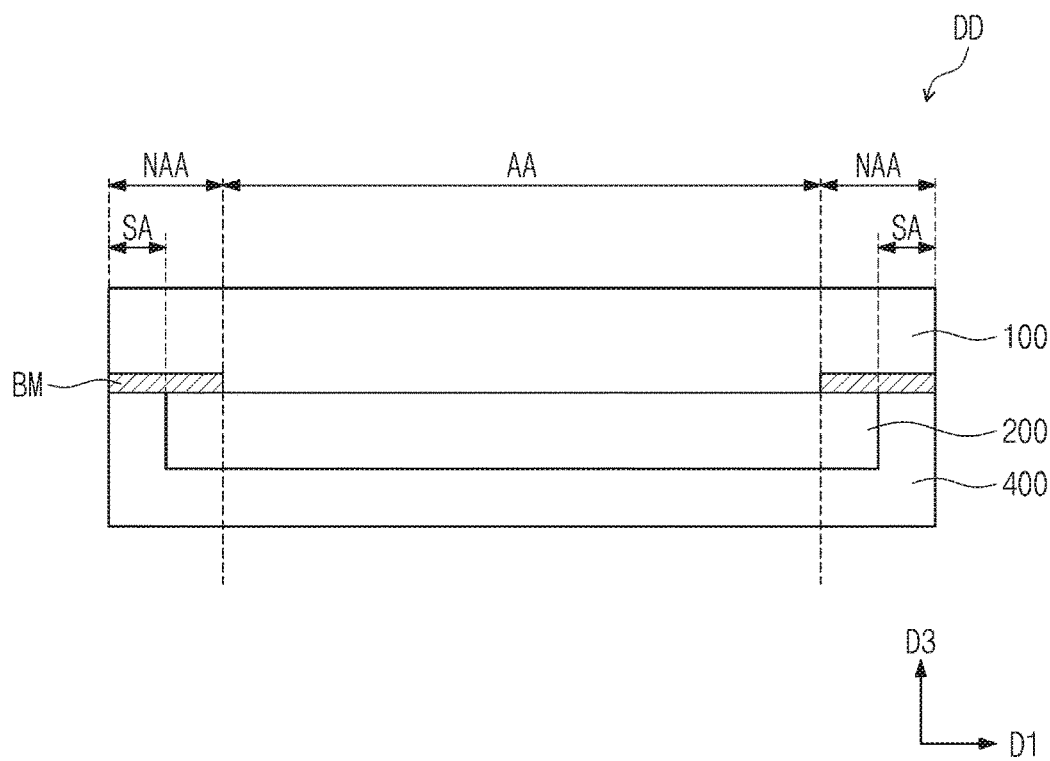
FIGS. 2A and 2B each are a cross-sectional view of a display device according to an example embodiment of the inventive concept.
Figure 2B:
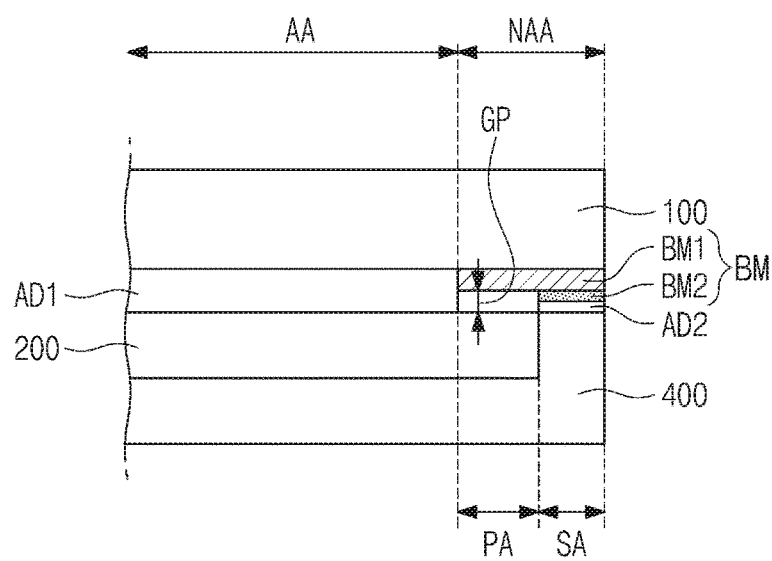

FIGS. 2A and 2B are different cross-sectional views of a display device according to an embodiment of the inventive concept.

FIG. 2A illustrates a cross section of a display device DD according to an embodiment of the inventive concept as seen in the second direction D2. In FIG. 2A, a peripheral area NAA of the window panel 100 of the display module 200 of the display device DD may have a structure symmetric with respect to an active area AA of the window panel 100 of the display module 200 of the display device DD.

FIG. 2B is an enlarged cross-sectional view of only one side of the peripheral area NAA of FIG. 2A. It is understood that, although only one side of the peripheral area NAA of FIG. 2B is shown as enlarged, the other side of the peripheral area NAA (not shown) may have the same structure as that illustrated in FIG. 2B.

Figure 3:
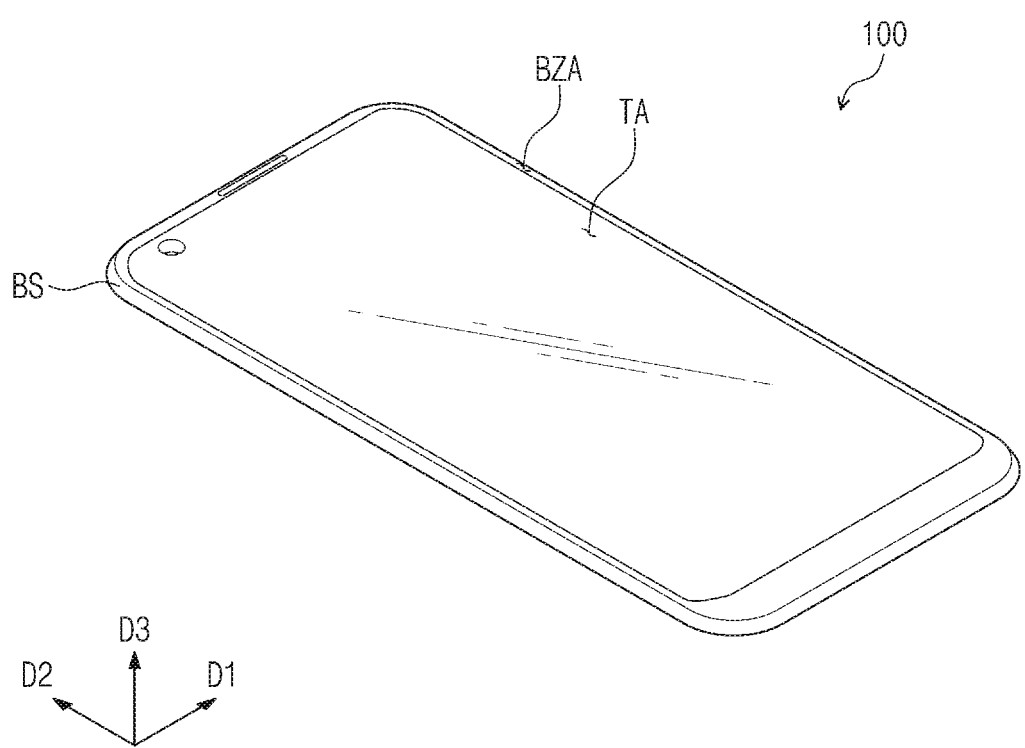
FIG. 3 is a perspective view of a window panel according to an example embodiment of the inventive concept.

With continued reference to FIGS. 2A and 2B, the display device DD may include a light-shielding pattern BM located between a window panel 100, on one side, and each of a display module 200 and a housing member 400, on the other side. The light-shielding pattern BM may be disposed on a surface of a base substrate BS of the window panel 100, as shown in FIG. 3, and may overlap the peripheral area NAA of the display module 200. That is, the light-shielding pattern BM may overlap the bezel area BZA of the base substrate, as shown in FIG. 1B. The light-shielding pattern BM may have an achromatic color, such as, for example, black.

Referring to FIG. 2B, the light-shielding pattern BM may include a first light-shielding pattern BM1 and a second light-shielding pattern BM2. The first light-shielding pattern BM1 may overlap a portion of the display module 200 and a portion of the housing member 400. The first light-shielding pattern BM1 may overlap the portion of the display module 200 in a first bonding area PA. The first light-shielding pattern BM1 may overlap the portion of the housing member 400 in a second bonding area SA.

The second light-shielding pattern BM2 may be bonded to the housing member 400 in the second bonding area SA. In the second bonding area SA, a second adhesive member AD2 may be disposed between the second light-shielding pattern BM2 and the housing member 400. The second adhesive member AD2 may include a transparent tape. For example, a surface of the second light-shielding pattern BM2 and the housing member 400 may be bonded to each other in the second bonding area SA.

As shown in FIG. 2B, the display module 200 may be disposed below the window panel 100. A first adhesive member AD1 may be disposed between the display module 200 and the window panel 100. The first adhesive member AD1 may include a transparent adhesive (OCA) and/or a pressure sensitive adhesive (PSA). A thickness of the first adhesive member AD1 may be greater than a thickness of the first light-shielding pattern BM1 located below the window panel 100. The first adhesive member AD1 may overlap the active area AA. The display module 200 and the window panel 100 may be bonded to each other by the first adhesive member AD1 in the active area AA. In the peripheral area NAA, a gap GP may be defined between the display module 200 and the first light-shielding pattern BM1. A surface of the first light-shielding pattern BM1 may be exposed in the gap GP. The display module 200 may partially overlap the first bonding area PA and may not overlap the second bonding area SA.

The housing member 400 may be disposed below the display module 200, bonded to the window panel 100 in the second bonding area SA. More specifically, the housing member 400 may be bonded to a bottom surface of the second light-shielding pattern BM2 in the second bonding area SA. The first light-shielding pattern BM1 and the second light-shielding pattern BM2 will be described in detail herein below with reference to FIGS. 5A and 5B.

Figure 4A:
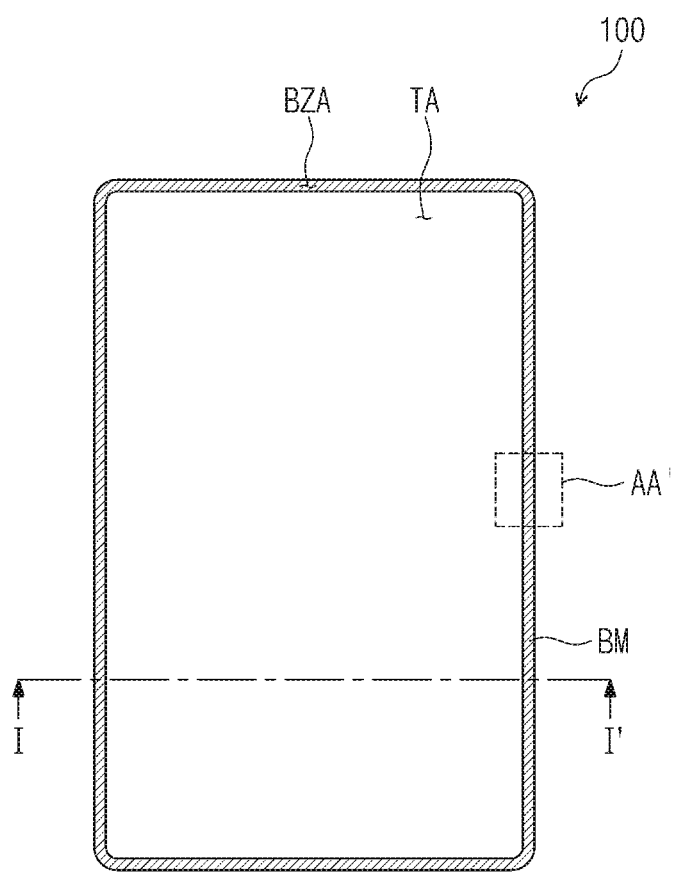
FIGS. 4A and 4B each are a plan view of the window panel according to an example embodiment of the inventive concept.
Figure 4B:
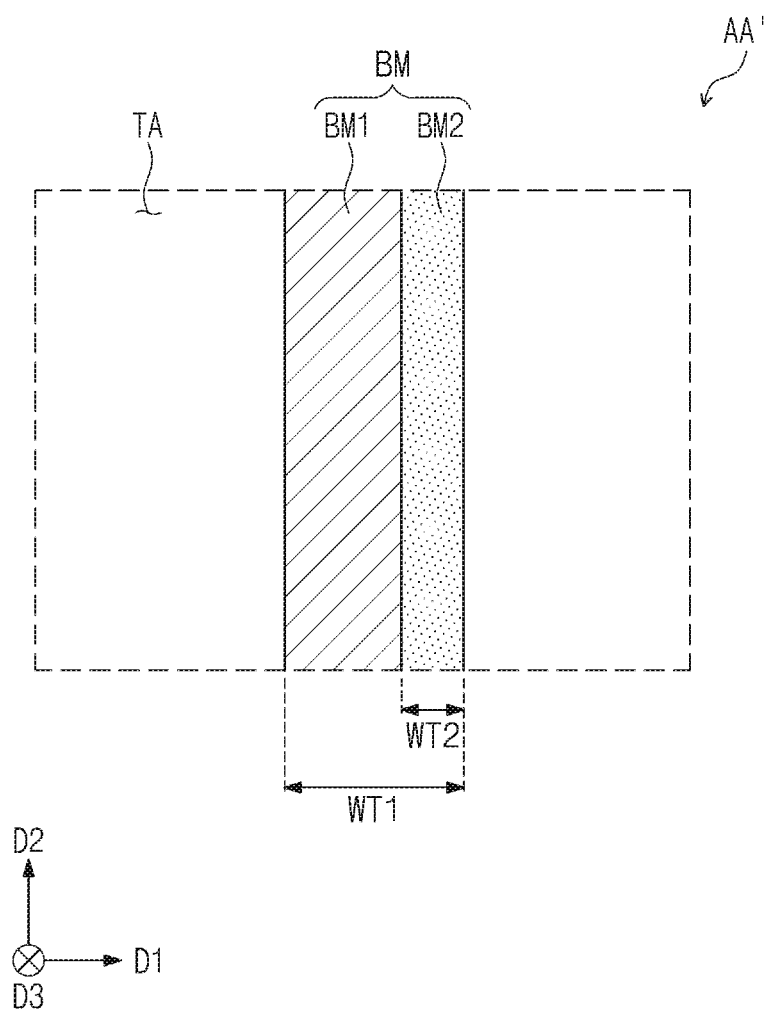

FIG. 3 is a perspective view of a window panel 100 according to an embodiment of the inventive concept and FIGS. 4A and 4B are plan views of the window panel 100 of FIG. 3, according to an embodiment.

Referring to FIGS. 3 to 4B, a window panel 100 may include a base substrate BS and a light-shielding pattern BM. The base substrate BS may be optically clear. For example, the base substrate BS may include glass or plastic. The base substrate BS may have a multilayer or single-layer structure. For example, the base substrate BS may have a laminated structure comprised of a plurality of plastic films bonded by an adhesive. In an embodiment, the base substrate BS may have a laminated structure of a glass substrate and a plastic film bonded by an adhesive.

In an embodiment, the base substrate BS may be divided into a transmission area TA and a bezel area BZA on the plane. The base substrate BS may include a front surface, which corresponds to a front surface FS of the window panel 100, and a rear surface opposite the front surface.

The light-shielding pattern BM may be disposed on a rear surface of the base substrate BS and may overlap the bezel area BZA of the base substrate BS. The light-shielding pattern BM may cover the bezel area BZA. In an embodiment, the light-shielding pattern BM may be substantially configured to define the bezel area BZA of the window panel 100. The light-shielding pattern BM may extend along the bezel area BZA.

FIG. 4B is an enlarged view of an area AA' in FIG. 4A. In FIG. 4B, a first light-shielding pattern BM1 may be disposed on a surface of the base substrate BS. A second light-shielding pattern BM2 may be disposed on a surface of the first light-shielding pattern BM1. A first width WT1 may extend from a first side surface of the base substrate BS to a second side surface of the base substrate BS below the bezel area BZA of the base substrate BS. A second width WT2 may extend from the first side surface of the base substrate BS to the second side surface of the base substrate BS below the bezel area BZA of the base substrate BS. The first width WT1 of the first light-shielding pattern BM1 may be greater than the second width WT2 of the second light-shielding pattern BM2. For example, in an embodiment, the second width WT2 may be equal to or less than about half of the first width WT1.

In an embodiment, the first light-shielding pattern BM1 and the second light-shielding pattern BM2 may include different materials and/or different properties. For example, a first surface roughness of the first light-shielding pattern BM1 may be different than and a second surface roughness of the second light-shielding pattern BM2. Here, roughness is defined as a degree of unevenness or smoothness of a surface. For example, as the roughness of the surface increases, the surface may be more uneven, and conversely, as the surface roughness decreases the surface may be smoother.

Figure 5A:
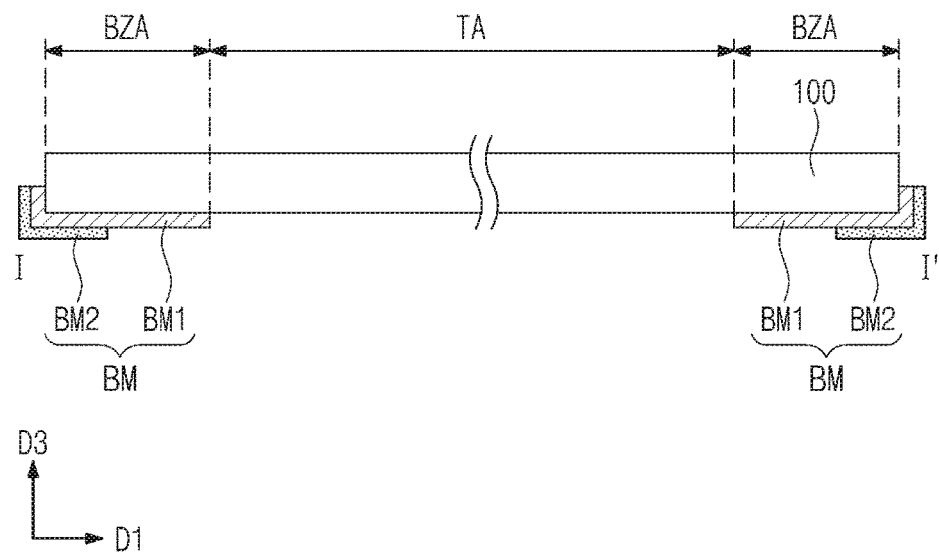
FIGS. 5A to 5C each are a cross-sectional view of a window panel according to an example embodiment of the inventive concept.
Figure 5B:
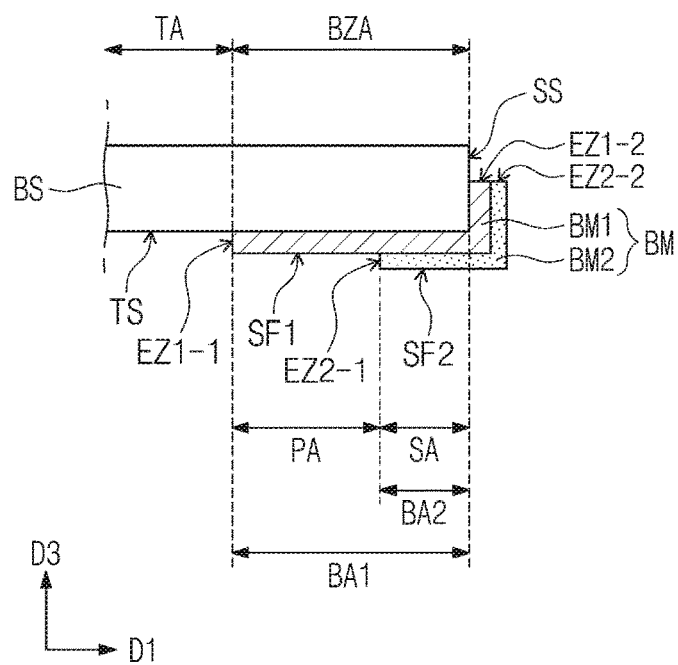
Figure 5C:
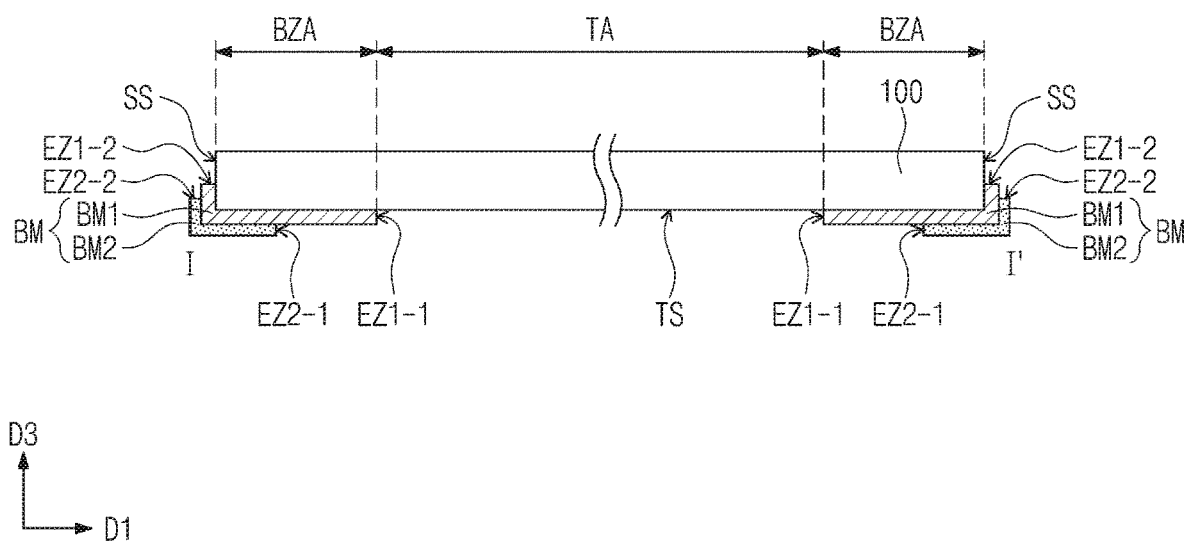

FIGS. 5A to 5C are cross-sectional views of a window panel 100 according to an embodiment of the inventive concept. Hereinafter, FIGS. 5A to 5C will be described with reference to FIG. 2B.

FIG. 5A illustrates a cross-sectional view of a surface of the display device DD taken along a line I-I' in FIG. 4A. FIG. 5B illustrates an enlarged view of a portion of FIG. 5A. It is understood that the unshown portion may have the same structure as the portion shown in FIG. 5B.

In FIGS. 5A to 5C, a base substrate BS may include a top surface TS and a side surface SS extending from the top surface TS. A light-shielding pattern BM may be disposed on a portion of the top surface TS and a portion of the side surface SS of the base substrate BS. In an embodiment, the light-shielding pattern BM may cover a portion of the side surface SS of the base substrate BS.

That is, in an embodiment, the side surface SS of the base substrate BS may be covered with the light-shielding pattern BM, thereby preventing light leakage from occurring through the side surface SS to the outside.

Although not illustrated, in one embodiment, the light-shielding pattern BM may cover the entirety of the side surface SS.

Although not illustrated, in one embodiment, the light-shielding pattern BM may cover the entirety of the side surface SS of the base substrate BS.

The light-shielding pattern BM disposed on the top surface TS of the base substrate BS may overlap a bezel area BZA of the base substrate BS. In an embodiment, a first light-shielding pattern BM1 and a second light-shielding pattern BM2 may have the same thickness. For example, the first light-shielding pattern BM1 and the second light-shielding pattern BM2 may each have a thickness substantially on the order of 7 um.

In an embodiment, the first light-shielding pattern BM1 may include a first edge EZ1-1 disposed on the top surface TS of the base substrate BS. The second light-shielding pattern BM2 may include a second edge EZ2-1 disposed on the top surface TS of the base substrate BS. Specifically, the second side edge EZ2-1 may be disposed on a surface SF1 of the first light-shielding pattern BM1.

The first light-shielding pattern BM1 may include the surface SF1 and one or more side surfaces which may include a first side edge EZ1-1 and a third side edge EZ1-2.

The first edge EZ1-1 may be disposed on the top surface TS of the base substrate BS, and the third edge EZ1-2 may be disposed on the side surface SS of the base substrate BS. The first edge EZ1-1 may be adjacent to a transmission area TA. The first edge EZ1-1 may be closer to the transmission area TA than the side surface SS of the base substrate BS in the first direction D1. In an embodiment, the first edge EZ1-1 may be aligned with the boundary between the transmission area TA and the bezel area BZA, as shown by the dotted line in FIG. 5B.

The second light-shielding pattern BM2 may include a surface SF2 and one or more side surfaces. The one or more side surfaces may include a second edge EZ2-1 and a fourth edge EZ2-2. The second edge EZ2-1 may be disposed on the surface of the first light-shielding pattern SF1, which is disposed in turn on the top surface TS of the base substrate BS. The fourth edge EZ2-2 may be disposed on the surface of the first light-shielding pattern SF1 on a side surface SS of the base substrate BS. The second edge EZ2-1 may be positioned closer to the side surface SS of the base substrate BS than the transmission area TA. Accordingly, the first edge EZ1-1 of the first light-shielding pattern BM1, and the second edge EZ2-1 of the second light-shielding pattern BM2, may be non-aligned with each other. The third edge EZ1-2 of the first light-shielding pattern BM1, and the fourth edge EZ2-2 of the second light-shielding pattern BM2, may be aligned with each other on the side surface SS of the base substrate BS.

In FIG. 5C, the third edge EZ1-2 of the first light-shielding pattern BM1, and the fourth edge EZ2-2 of the second light-shielding pattern BM2, may be non-aligned with each other on the side surface SS of the base substrate BS. That is, on the side surface SS of the base substrate BS, the length of the third edge EZ1-2 may be longer than the length of the fourth edge EZ2-2.

In an embodiment, the bezel area BZA may include a first light-shielding area BA1 and a second light-shielding area BA2. The first light-shielding pattern BM1 may be disposed in the first light-shielding area BA1, and the second light-shielding pattern BM2 may be disposed in the second light-shielding area BA2. More specifically, the surface SF1 of the first light-shielding pattern BM1 may overlap the first light-shielding area BA1. The surface SF2 of the second light-shielding pattern BM2 may overlap the second light-shielding area BA2. The width of the first light-shielding area BA1 may be the same as the first width WT1 (see FIG. 4B), and the width of the second light-shielding area BA2 may be the same as the second width WT2 (see FIG. 4B). The surface of the first light-shielding pattern SF1 may correspond to a surface from the first edge EZ1-1 to the third edge EZ1-2, and the surface of the second light-shielding pattern SF2 may correspond to a surface from the second edge EZ2-1 to the fourth edge EZ2-2. That is, a portion of the surface of the first light-shielding pattern SF1 may overlap the first light-shielding area BA1. A portion of the surface of the second light-shielding pattern SF2 may overlap the second light-shielding area BA2.

Referring to FIG. 5B, a first bonding area PA and a second bonding area SA may be defined in the first light-shielding area BA1. The first bonding area PA may overlap a portion of the surface of the first light-shielding pattern SF1. That is, a portion, not covered by the surface of the second light-shielding pattern SF2, of the surface of the first light-shielding pattern SF1 may be disposed in the first bonding area PA. The surface of the second light-shielding pattern SF2 may be disposed in the second bonding area SA. The width of the second bonding area SA may be substantially the same as the second width WT2 of the second light-shielding pattern BM2.

The surface of the first light-shielding pattern SF1 may have a first surface roughness. The surface of the second light-shielding pattern SF2 may have a second surface roughness. Since the first light-shielding pattern BM1 and the second light-shielding pattern BM2 may include different materials, the first surface roughness and the second surface roughness may be different. For example, the first surface roughness may be less than the second surface roughness.

With reference to FIG. 2B, the surface roughness of the surface of the first light-shielding pattern SF1 may be advantageously less than the surface roughness of the surface of the second light-shielding pattern SF2. As the surface of the first light-shielding pattern SF1 is relatively smoother, by virtue of having a lower surface roughness, inter-layer bubbles between the display module 200 and the first adhesive member AD1 may be advantageously removed, without being trapped, through the surface of the first light-shielding pattern SF1. Accordingly, adhesion between the display module 200 and the window panel 100 may beneficially increase.

Further, as the surface of the second light-shielding pattern SF2 is relatively more uneven, adhesion of the housing member 400, which is bonded to the window panel 100, may beneficially increase. The housing member 400 may be bonded to the surface of the second light-shielding pattern SF2 in the second bonding area SA. As the surface of the second light-shielding pattern SF2 is more uneven, the surface area, which is bonded to the housing member 400, may become larger and the surface energy may increase, thereby beneficially increasing the adhesion between the second light-shielding pattern SF2 and the housing member 400.

The second bonding area SA, in which the housing member 400 is bonded to the window panel 100, may not overlap the first bonding area PA in which the display module 200 is bonded to the window panel 100. Even when ink splashes occur during the bonding of the display module 200, the ink may be hidden by the second light-shielding pattern BM2 in the second bonding area SA because the first bonding area PA is separated from the second bonding area SA.

An embodiment of the inventive concept may provide a window panel 100 with improved adhesion when bonded to the display module 200 and a housing member 400 and a display device DD including the window panel 100 with improved adhesion.

According to an embodiment of the inventive concept, the window panel 100 and the display device DD including the window panel 100 may include the first light-shielding pattern BM1 and the second light-shielding pattern BM2 having different properties, thereby advantageously increasing the adhesion between the window panel 100 and each of the display module DD and the housing 400.

According to an embodiment of the inventive concept, the window panel 100 and the display device DD including the window panel 100 may include the first light-shielding pattern and the second light-shielding pattern which have different widths, thereby increasing the adhesion between the window panel 100 and each of the display module 200 and the housing member 400.

Although the embodiments of the present invention have been described, it is understood that the present invention should not be limited to these embodiments but various changes and modifications can be made by one ordinary skilled in the art within the spirit and scope of the present invention as hereinafter claimed. Therefore, the technical scope of the inventive concept is not limited to the contents described in the detailed description of the specification, but should be determined by the claims.

What is claimed is:

1. A window comprising:
  a base substrate in which a transmission area and a bezel area adjacent to the transmission area are defined, wherein the base substrate comprises a first surface and a side surface adjacent to the first surface; and
  a light-shielding pattern disposed on the base substrate and overlapping the bezel area,
  wherein the light-shielding pattern comprises:
    a first light-shielding pattern disposed on the first surface and the first side surface of the base substrate and having a first width; and
    a second light-shielding pattern disposed on the first light-shielding pattern and having a second width overlapping a portion of the first width,
  wherein the first light-shielding pattern includes a second surface covering and contacting the first surface of the base substrate, a second-first side surface covering and contacting the first side surface of the base substrate and a second-second side surface opposite to the second-first side surface in a first direction, and
  the second light-shielding pattern includes a third side surface covering and contacting the second-second side surface of the first light-shielding pattern, and the second light-shielding pattern is spaced apart from the base substrate in the first direction and in a second direction, the second direction being perpendicular to the first direction.

2. The window of claim 1, wherein the second width is equal to or less than about a half of the first width, wherein a gap is defined between the first light-shielding pattern and the second light-shielding pattern by the difference in width between the first light-shielding pattern and the second light-shielding pattern.

3. The window of claim 1, wherein a surface of the first light-shielding pattern has a first roughness, and a surface of the second light-shielding pattern has a second roughness, the first roughness and the second roughness being different from each other.

4. The window of claim 3, wherein the first roughness is lower than the second roughness.

5. The window of claim 1, wherein the first light-shielding pattern and the second light-shielding pattern comprise different materials.

6. The window of claim 5, wherein
  the first light-shielding pattern comprises a first edge disposed on the first surface of the base substrate, and the second light-shielding pattern comprises a second edge disposed on the first surface of the base substrate, the first edge is more adjacent to the transmission area between the side surface of the base substrate and the transmission area, and the second edge is more adjacent to the side surface of the base substrate between the side surface and the transmission area.

7. The window of claim 6, wherein the first edge is aligned with a boundary between the transmission area and the bezel area.

8. The window of claim 5, wherein the first light-shielding pattern comprises a third edge disposed on the side surface of the base substrate, and the second light-shielding pattern comprises a fourth edge disposed on the side surface of the base substrate, the third edge and the fourth edge being aligned with each other.

9. The window of claim 5, wherein the first light-shielding pattern comprises a third edge disposed on the side surface of the base substrate, and the second light-shielding pattern comprises a fourth edge disposed on the side surface of the base substrate, the third edge and the fourth edge being non-aligned with each other.

10. A display device comprising:
a window panel;
a display module disposed below the window panel configured to display an image; and
a housing member disposed below the display module, coupled to the window panel, the housing member configured to provide an accommodation space for the display module,
wherein the window panel comprises:
  a base substrate including a transmission area, a bezel area adjacent to the transmission area, the base substrate having a first surface and a side surface adjacent to the first surface, and
  a light-shielding pattern disposed on the base substrate and overlaps the bezel area,
wherein the light-shielding pattern comprises
  a first light-shielding pattern having a first portion and a second portion, the first portion disposed on the first surface of the base substrate having a first width, the second portion disposed on the side surface of the base substrate, and
  a second light-shielding pattern having a third portion and a fourth portion, the third portion disposed on the first portion of the first light-shielding pattern, the fourth portion disposed on the second portion of the first light-shielding pattern, the third portion having a second width, the second width is less than the first width, and
wherein the second light-shielding pattern is spaced apart from the base substrate in a first direction and in a second direction, the second direction being perpendicular to the first direction.

11. The display device of claim 10, wherein the first light-shielding pattern and the second light-shielding pattern comprise different materials, and a surface of the first light-shielding pattern has a first roughness, and a surface of the second light-shielding pattern has a second roughness, the first roughness and the second roughness being different from each other.

12. The display device of claim 11, wherein the first roughness is lower than the second roughness.

13. The display device of claim 10, wherein the display module partially overlaps the first light-shielding pattern and does not overlap the second light-shielding pattern.

14. The display device of claim 10, wherein the housing member is bonded to a surface of the second light-shielding pattern.

15. The display device of claim 10, wherein the housing member comprises a bonding area which is bonded to the window panel,
wherein a width of the bonding area is substantially the same as the second width of the second light-shielding pattern.

16. The display device of claim 10, wherein the display module comprises an active area and a peripheral area, and the display module and the window panel are bonded to each other through a first adhesive member in the active area.

17. The display device of claim 16, wherein a thickness of the first adhesive member is greater than a thickness of the first light-shielding pattern, and
in the peripheral area, a gap is defined between the display module and the first light-shielding pattern.

18. The display device of claim 10, wherein the display module overlaps the first light-shielding pattern in a first bonding area, and the housing member overlaps the second light-shielding pattern in a second bonding area, and
the first bonding area and the second bonding area do not overlap each other.

19. An electronic device comprising:
a display device;
wherein the display device comprises:
  a window,
  a display module disposed below the window and configured to display an image; and
  a housing member disposed below the display module, and coupled to the window to provide an accommodation space in which the display module is accommodated,
wherein the window comprises
  a base substrate including a transmission area and a bezel area adjacent to the transmission area, the base substrate having a first surface and a side surface adjacent to the first surface, and
  a light-shielding pattern disposed on the base substrate and overlapping the bezel area,
the light-shielding pattern comprises:
  a first light-shielding pattern having a first portion and a second portion, the first portion disposed on the first surface of the base substrate having a first width, the second portion disposed on the side surface of the base substrate, and
  a second light-shielding pattern having a third portion and a fourth portion, the third portion disposed on the first portion of the first light-shielding pattern, the fourth portion disposed on the second portion of the first light-shielding pattern, the third portion having a second width, the second width is less than the first width, and
wherein the housing member is bonded to a surface of the second light-shielding pattern, and
wherein the second light-shielding pattern is spaced apart from the base substrate in a first direction and in a second direction, the second direction being perpendicular to the first direction.

* * * * *